(12) United States Patent
Shao et al.

(10) Patent No.: US 11,947,225 B2
(45) Date of Patent: Apr. 2, 2024

(54) LIQUID CRYSTAL DISPLAY PANEL AND MANUFACTURING METHOD THEREOF

(71) Applicant: TCL China Star Optoelectronics Technology Co., Ltd., Shenzhen (CN)

(72) Inventors: Yuan Shao, Shenzhen (CN); Chunqiu Yan, Shenzhen (CN); Hsiaohsien Chen, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 3 days.

(21) Appl. No.: 16/754,761

(22) PCT Filed: Mar. 6, 2020

(86) PCT No.: PCT/CN2020/078198
§ 371 (c)(1),
(2) Date: Oct. 18, 2022

(87) PCT Pub. No.: WO2021/164063
PCT Pub. Date: Aug. 26, 2021

(65) Prior Publication Data
US 2023/0054985 A1 Feb. 23, 2023

(30) Foreign Application Priority Data

Feb. 21, 2020 (CN) .......................... 202010106309.4

(51) Int. Cl.
*G02F 1/1339* (2006.01)
*G02F 1/1333* (2006.01)

(52) U.S. Cl.
CPC .... *G02F 1/13396* (2021.01); *G02F 1/133354* (2021.01); *G02F 1/13394* (2013.01); *G02F 1/13398* (2021.01)

(58) Field of Classification Search
CPC ........... G02F 1/13396; G02F 1/133354; G02F 1/13394; G02F 1/13398
See application file for complete search history.

(56) References Cited

U.S. PATENT DOCUMENTS

| | | |
|---|---|---|
| 2015/0226991 A1 | 8/2015 | Han et al. |
| 2019/0171054 A1 | 6/2019 | Chen et al. |

FOREIGN PATENT DOCUMENTS

| | | |
|---|---|---|
| CN | 102231026 A | 11/2011 |
| CN | 102749760 A | 10/2012 |

(Continued)

OTHER PUBLICATIONS

CN 110687724 A (Liang, Yu-heng) (Year: 2020).*

*Primary Examiner* — James A Dudek
(74) *Attorney, Agent, or Firm* — PV IP PC; Wei Te Chung; Zhigang Ma

(57) ABSTRACT

The present application provides a liquid crystal display panel and a manufacturing thereof. The liquid crystal display panel includes a first substrate, a second substrate, a liquid crystal layer, and support posts. Each of the support posts includes a support post body and an expandable auxiliary pad. In a first state, the auxiliary pad is in a non-expanded state, and in a second state, the auxiliary pad is in an expanded state. This compensates for a height difference caused by the support post body which cannot be restored after being compressed by an external force and relieves a problem of appearance of Mura in the liquid crystal display panel.

16 Claims, 3 Drawing Sheets

(56) References Cited

FOREIGN PATENT DOCUMENTS

| | | |
|---|---|---|
| CN | 103323982 A | 9/2013 |
| CN | 104570503 A | 4/2015 |
| CN | 107908046 A | 4/2018 |
| CN | 110687724 A | 1/2020 |
| JP | H07325306 A | 12/1995 |

\* cited by examiner

LIQUID CRYSTAL DISPLAY PANEL AND MANUFACTURING METHOD THEREOF

FIELD OF APPLICATION

The present application is related to the display field, and specifically, to a liquid crystal display panel and a manufacturing method thereof.

BACKGROUND OF APPLICATION

In the field of thin-film transistor liquid crystal display (TFT-LCD) technology, support posts are usually adopted to maintain uniformity of a thickness of liquid crystal cells. A composition of mainstream material of the support posts is generally ultraviolet curable acrylic resin.

It can be found in actual applications that in a process of a vibration test or transportation of liquid crystal display panels, ring-shaped or horizontal black and white banded stripes (Mura) frequently occur. Reasons for this are that during the process of the vibration test or transportation, portions of the liquid crystal display panels are subjected to external force, which causes the support posts in local regions to receive excessive force. The external force is removed after long-term compression, while the support posts cannot be restored to their original state, causing a height of the support posts in this region to be lower than a height of the support posts in a normal area, thereby leading to uneven thickness of the liquid crystal cells and forming Mura.

Therefore, a problem of Mura existing in the liquid crystal display panels in the prior art needs to be solved.

SUMMARY OF APPLICATION

The present application provides a liquid crystal display panel and a manufacturing method thereof to improve a problem of Mura existing in the liquid crystal display panels in the prior art.

The present application provides a liquid crystal display panel, including:
a first substrate;
a second substrate;
a liquid crystal layer filled between the first substrate and the second substrate; and
support posts disposed between the first substrate and the second substrate configured to support the first substrate and the second substrate and ensure a distance between the first substrate and the second substrate, wherein each of the support posts includes a support post body and an expandable auxiliary pad;
wherein in a first state, the auxiliary pad is in a non-expanded state, and in a second state, the auxiliary pad is in an expanded state.

In the liquid crystal display panel provided by the present application, the support post body and the auxiliary pad are disposed on the first substrate.

In the liquid crystal display panel provided by the present application, the auxiliary pad is disposed on a side of the first substrate near the second substrate, and the support post body is disposed on a side of the auxiliary pad near the second substrate.

In the liquid crystal display panel provided by the present application, the support post body is disposed on a side of the first substrate near the second substrate, and the auxiliary pad is disposed on a side of the support post body near the second substrate.

In the liquid crystal display panel provided by the present application, the support post body is disposed on the first substrate, the auxiliary pad is disposed on the second substrate, and the support post body is disposed opposite to the auxiliary pad.

In the liquid crystal display panel provided by the present application, material of the auxiliary pad includes an expansive material.

In the liquid crystal display panel provided by the present application, the expansive material includes cesium-doped lead triiodide perovskite mixed with organic cations.

In the liquid crystal display panel provided by the present application, the cesium-doped lead triiodide perovskite mixed with organic cations is present in an amount of 10 to 80% of an overall mass of the auxiliary pad.

In the liquid crystal display panel provided by the present application, the auxiliary pad is a cube block with a thickness ranging from 0.1 to 5 um and a width ranging from 20 to 200 um.

In the liquid crystal display panel provided by the present application, the support post body is a circular column or a circular stage with a height ranging from 1 to 10 um and a diameter ranging from 5 to 100 um.

In the liquid crystal display panel provided by the present application, a width of the auxiliary pad is 2 to 10 um greater than a cross-sectional diameter of a contact area between the support post body and the auxiliary pad.

In the liquid crystal display panel provided by the present application, the support posts include a primary support post and a secondary support post, the primary support post includes a primary support post body and an expandable auxiliary pad, and the secondary support post includes a secondary support post body.

In the liquid crystal display panel provided by the present application, the support posts include a primary support post and a secondary support post, the primary support post includes a primary support post body and an expandable primary auxiliary pad, and the secondary support post includes a secondary support post body and an expandable secondary auxiliary pad.

At the same time, the present application provides a manufacturing method of a liquid crystal display panel, including:
forming a first substrate and a second substrate;
forming support posts, wherein each of the support posts includes a support post body and an expandable auxiliary pad, in a first state, the auxiliary pad is in a non-expanded state, and in a second state, the auxiliary pad is changed from the non-expanded state to an expanded state; and
assembling the first substrate and the second substrate face to face.

In the manufacturing method of the liquid crystal display panel provided by the present application, forming the support posts includes:
mixing an expansive material into a photoresist material in a predetermined ratio to form a material for the auxiliary pad; and
forming the auxiliary pad and the support post pad.

In the manufacturing method of the liquid crystal display panel provided by the present application, forming the auxiliary pad and the support post pad includes:
forming the support post body on a side of the first substrate facing the second substrate; and
forming the auxiliary pad on a side of the second substrate facing the first substrate; wherein when assembling, the auxiliary pad corresponds to the support post body.

In the manufacturing method of the liquid crystal display panel provided by the present application, forming the auxiliary pad and the support post pad includes:

forming the auxiliary pad on a side of the first substrate facing the second substrate; and forming the support post body on a side of the support post body away from the first substrate.

In the manufacturing method of the liquid crystal display panel provided by the present application, forming the auxiliary pad and the support post pad includes:

forming the support post body on a side of the first substrate facing the second substrate; and forming the auxiliary pad on a side of the support post body away from the first substrate.

In the manufacturing method of the liquid crystal display panel provided by the present application, a forming process of the auxiliary pad and the support post body includes exposure and development, inkjet printing, or coating method.

In the manufacturing method of the liquid crystal display panel provided by the present application, changing of the auxiliary pad from the non-expanded state to the expanded state includes:

irradiating a compressed region of the liquid crystal display panel with light equivalent to nine sunlight intensities for 100 to 180 minutes.

The present application provides the liquid crystal display panel and the manufacturing method thereof. The liquid crystal display panel includes the first substrate, the second substrate, the liquid crystal layer filled between the first substrate and the second substrate, and the support posts disposed between the first substrate and the second substrate configured to support the first substrate and the second substrate and ensure the distance between the first substrate and the second substrate. Each of the support posts includes the support post body and the expandable auxiliary pad. In the first state, the auxiliary pad is in the non-expanded state, and in the second state, the auxiliary pad is in the expanded state. When the liquid crystal display panel is in a normal state, the auxiliary pad is in the non-expanded state. After the liquid crystal display panel is compressed by an external force, the auxiliary pad in the compressed region is processed, so the auxiliary pad in the compressed region is transformed from the non-expanded state to the expanded state which is stable. The auxiliary pad in the expanded state increases its own thickness, which compensates for a height difference caused by a corresponding support post body which cannot be restored after being compressed by the external force. This relieves the problem of the appearance of Mura in the liquid crystal display panel, which is caused by the support posts being unable to uniformly support the first substrate and the second substrate due to failure of the support post body to fully restore as a result of compression by an excessive force.

BRIEF DESCRIPTION OF DRAWINGS

The following describes specific embodiments of the present application in detail with reference to the accompanying drawings, which will make technical solutions and other beneficial effects of the present application obvious.

Figure 1:
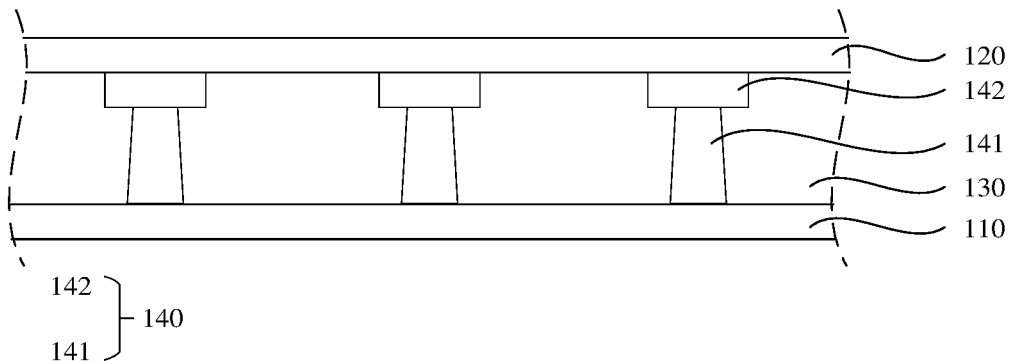
FIG. 1 is a structural diagram of a first structure of a liquid crystal display panel provided by an embodiment of the present application in a first state.

Reference signs: first substrate 110, second substrate 120, liquid crystal layer 130, support post 140, support post body 141, auxiliary pad 142, compressed region 201, compressed region 401, external force F.

Detailed Description of Preferred Embodiments

Examples are described below with reference to the appended drawings, and the drawings illustrate particular embodiments in which the present application may be practiced. Directional terms mentioned in the present application, such as upper, lower, front, rear, left, right, in, out, side, etc., only refer to directions in the accompanying drawings. Thus, the adoption of directional terms is used to describe and understand the present application, but not to limit the present application. In the drawings, units of similar structures are represented using the same numerals.

Aiming at a problem of Mura existing in liquid crystal display panels in the prior art, an embodiment of the present application provides a liquid crystal display panel to relieve this problem.

In an embodiment, as shown in FIGS. 1 to 4, the liquid crystal display panel provided by the present application includes:

a first substrate 110;

a second substrate 120;

a liquid crystal layer 130 filled between the first substrate 110 and the second substrate 120; and support posts 140 disposed between the first substrate 110 and the second substrate 120 configured to support the first substrate 110 and the second substrate 120 and ensure a distance between the first substrate 110 and the second substrate 120, wherein each of the support posts 140 includes a support post body 141 and an expandable auxiliary pad 142;

wherein in a first state, the auxiliary pad is in a non-expanded state, and in a second state, the auxiliary pad is in an expanded state.

The present application provides the liquid crystal display panel. Each of the support posts of the liquid crystal display panel includes the support post body and the expandable auxiliary pad. When the liquid crystal display panel is in a normal state, the auxiliary pad is in the non-expanded state. After the liquid crystal display panel is compressed by an external force, the auxiliary pad in a compressed region is processed, so the auxiliary pad in the compressed region is transformed from the non-expanded state to the expanded state which is stable. The auxiliary pad in the expanded state increases its own thickness, which compensates for a height difference caused by a corresponding support post body which cannot be restored after being compressed by the external force. This relieves the problem of the appearance of Mura in the liquid crystal display panel, which is caused by the support posts being unable to uniformly support the first substrate and the second substrate due to failure of the support post body to fully restore as a result of compression by an excessive force.

In the liquid crystal display panel provided in the present application, the first substrate 110 and the second substrate 120 are only used to describe that the liquid crystal display panel includes two substrates, and are not specifically referred to or limited herein. In an embodiment, the first substrate 110 is a color filter substrate, and the second substrate 120 is an array substrate. In another embodiment, the first substrate 110 is the array substrate, and the second substrate 120 is the color filter substrate. Drawings of embodiments of the present application are structure diagrams of the liquid crystal display panel of the present application. Up and down directions are only for explanation of the drawings, and are not used to describe display directions or orientations of the liquid crystal display panel.

In the liquid crystal display panel, the support posts generally include a primary support post and a secondary support post. A horizontal height of the primary support post is greater than a horizontal height of the secondary support post. The primary support post is configured to mainly support the first substrate and the second substrate. The secondary support post is configured to assist in supporting the first substrate and the second substrate.

In an embodiment, the primary support post includes a primary support post body and an expandable auxiliary pad, and the secondary support post only includes a secondary support post body. In this embodiment, the auxiliary pad can increase a difference between the primary support post and the secondary support post at the same time.

In another embodiment, the primary support post includes a primary support post body and an expandable primary auxiliary pad, and the secondary support post includes a secondary support post body and an expandable secondary auxiliary pad.

The following takes a support post including the support post body and the auxiliary pad as an example to further explain the liquid crystal display panel provided by the present application.

In an embodiment, each of the support posts 140 is disposed on the first substrate 110, which means that the support post body 141 and the auxiliary pad 142 are all disposed on the first substrate 110. The support post body 141, the auxiliary pad 142, and the first substrate 110 are integrally provided.

Figure 2:
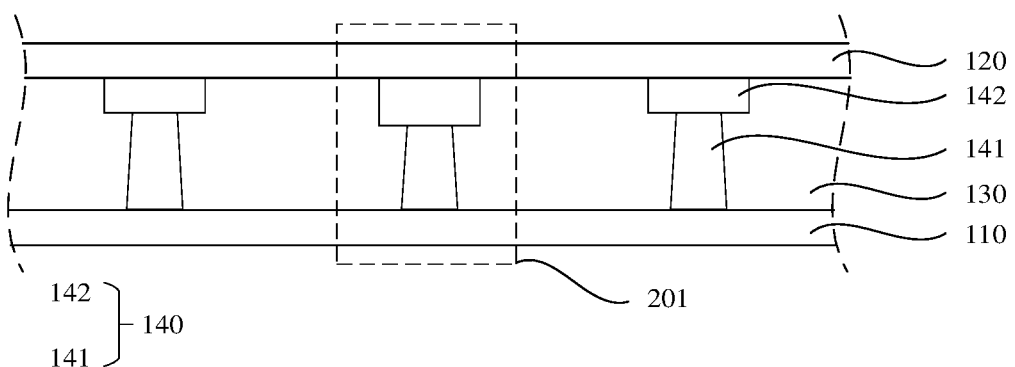
FIG. 2 is a structural diagram of the first structure of the liquid crystal display panel provided by an embodiment of the present application in a second state.

In an embodiment, as shown in FIGS. 1 and 2, the support post body 141 is disposed on a side of the first substrate 110 near the second substrate 120, and the auxiliary pad 142 is disposed on a side of the support post body 141 near the second substrate 120.

In this embodiment, when the liquid crystal display panel is in the first state, which is normal and not compressed, as shown in FIG. 1, the auxiliary pad 142 is in the non-expanded state. The auxiliary pad 142 contacts the second substrate 120 as a portion of each of the support posts 140, uniformly supports the first substrate 110 and the second substrate 120 with the support post body 141, and maintains uniformity of the liquid crystal display panel.

When the liquid crystal display panel is in the second state, which means that the liquid crystal display panel is compressed by the external force, as shown in FIG. 2, the support post body 141 in a compressed region 201 is compressed by an excessive force, and its original height cannot be completely restored after the external force is removed, so a height of the support post body in the compressed region 201 is less than a height of the support post body outside the compressed region 201. At this time, the auxiliary pad 142 in the compressed region 201 is in the expanded state, and the auxiliary pad in the expanded state increases its own thickness, so a thickness of the auxiliary pad in the compressed region 201 is greater than a thickness of the auxiliary pad outside the compressed region 201. This compensates for a height difference caused by the support post body in the compressed region 201 which cannot be restored after being compressed by the external force, and relieves the problem of the appearance of Mura in the liquid crystal display panel, which is caused by the support posts being unable to uniformly support the first substrate and the second substrate due to failure of the support post body to fully restore as a result of compression by an excessive force.

Figure 3:
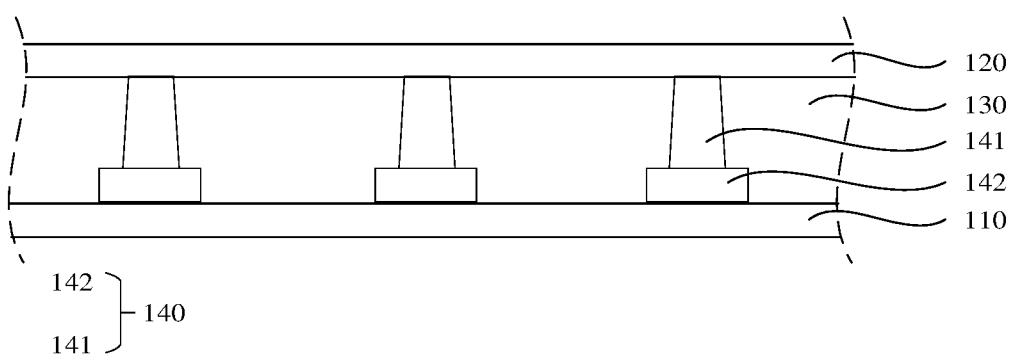
FIG. 3 is a structural diagram of a second structure and a third structure of the liquid crystal display panel provided by an embodiment of the present application in the first state.
Figure 4:
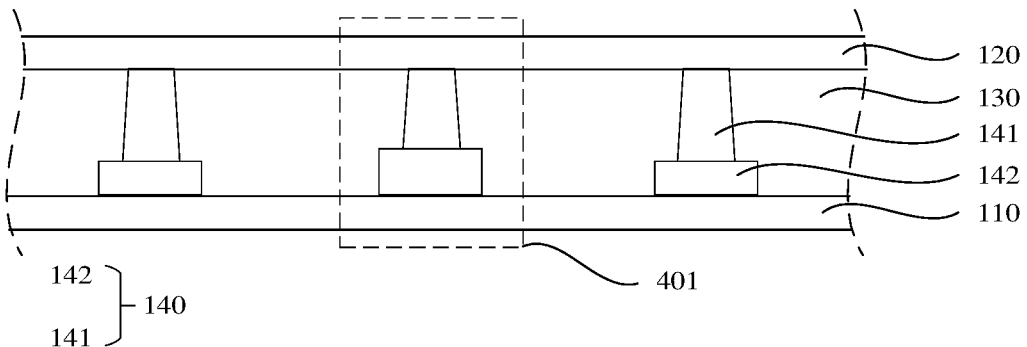
FIG. 4 is a structural diagram of the second structure and the third structure of the liquid crystal display panel provided by an embodiment of the present application in the second state.

In another embodiment, as shown in FIGS. 3 and 4, the auxiliary pad 142 is disposed on a side of the first substrate 110 near the second substrate 120, and the support post body 141 is disposed on a side of the auxiliary pad 142 near the second substrate 120.

In this embodiment, when the liquid crystal display panel is in the first state, which is normal and not compressed, as shown in FIG. 3, the auxiliary pad 142 is in the non-expanded state. The auxiliary pad 142, as a portion of each of the support posts 140, uniformly supports the first substrate 110 and the second substrate 120 with support post body 141, and maintains uniformity of the liquid crystal display panel.

When the liquid crystal display panel is in the second state, which means that the liquid crystal display panel is compressed by the external force, as shown in FIG. 4, the support post body 141 in a compressed region 401 is compressed by an excessive force, and its original height cannot be completely restored after the external force is removed, so an absolute height of the support post body in the compressed region 401 is less than an absolute height of the support post body outside the compressed region 401. At this time, the auxiliary pad 142 in the compressed region 401 is in the expanded state, and the auxiliary pad in the expanded state increases its own thickness, so a thickness of the auxiliary pad in the compressed region 401 is greater than a thickness of the auxiliary pad outside the compressed region 401. The thickness of the auxiliary pad in the compressed region 401 is increased, and the support post body is moved upward in a vertical direction, which further makes a horizontal height of the support post body in the compressed region 401 same as a horizontal height of the support post body outside the compressed region 401. This compensates for a height difference caused by the support post body in the compressed region 401 which cannot be restored after being compressed by the external force, and relieves the problem of the appearance of Mura in the liquid crystal display panel, which is caused by the support posts being unable to uniformly support the first substrate and the second substrate due to failure of the support post body to fully restore as a result of compression by an excessive force.

In an embodiment, each of the support posts 140 is disposed separately, which means that the support post body 141 and the auxiliary pad 142 are disposed on different substrates of the liquid crystal display panel. in an embodiment, as shown in FIGS. 1 and 2, the support post body 141 is disposed on the first substrate 110, that is, the support post body 141 and the first substrate 110 are integrally provided. The auxiliary pad 142 is disposed on the second substrate 120, that is, the auxiliary pad 142 and the second substrate 120 are integrally provided. The support post body 141 and the auxiliary pad 142 are oppositely disposed.

In this embodiment, when the liquid crystal display panel is in the first state, which is normal and not compressed, as shown in FIG. 1, the auxiliary pad 142 is in the non-expanded state. The auxiliary pad 142 contacts the second substrate 120 as a portion of each of the support posts 140, uniformly supports the first substrate 110 and the second substrate 120 with the support post body 141, and maintains uniformity of the liquid crystal display panel.

When the liquid crystal display panel is in the second state, which means that the liquid crystal display panel is compressed by the external force, as shown in FIG. 2, the support post body 141 in a compressed region 201 is compressed by an excessive force, and its original height cannot be completely restored after the external force is removed, so a height of the support post body in the compressed region 201 is less than a height of the support post body outside the compressed region 201. At this time, the auxiliary pad 142 in the compressed region 201 is in the expanded state, and the auxiliary pad in the expanded state increases its own thickness, so a thickness of the auxiliary pad in the compressed region 201 is greater than a thickness of the auxiliary pad outside the compressed region 201. This compensates for a height difference caused by the support post body in the compressed region 201 which cannot be restored after being compressed by the external force, and relieves the problem of the appearance of Mura in the liquid crystal display panel, which is caused by the support posts being unable to uniformly support the first substrate and the second substrate due to failure of the support post body to fully restore as a result of compression by an excessive force.

As shown in FIGS. 1 and 3, when the liquid crystal display panel is in the first state, the support post body 141 is a circular column or a circular stage with a height ranging from 1 to 10 um and a diameter ranging from 5 to 100 um. The auxiliary pad 142 is a cube block or a circular column with a thickness ranging from 0.1 to 5 um and a width ranging from 20 to 200 um. The width of the auxiliary pad 142 is 2 to 10 um greater than a cross-sectional diameter of a contact area between the support post body 141 and the auxiliary pad 142, and a center of the auxiliary pad 142 coincides with a center of the support post body 141. The width of the auxiliary pad 142 is greater than the cross-sectional diameter of the contact area between the support post body 141 and the auxiliary pad 142, which ensures good contact between the auxiliary pad 142 and the support post body 141 and uniformity of a force between the auxiliary pad 142 and the support post body 141. The center of the auxiliary pad 142 coincides with the center of the support post body 141, which ensures that in the expanded state, the auxiliary pad 142 can also maintain a uniform force with the support post body 141.

Material of the auxiliary pad 142 includes an expansive material. The expansive material is a material that can expand in volume under certain conditions and cannot be restored after volume expansion. In an embodiment, the expansive material includes cesium-doped lead triiodide perovskite mixed with organic cations ($Fa_{0.7}Ma_{0.25}Cs_{0.05}PbI_3$). The cesium-doped lead triiodide perovskite mixed with organic cations is present in an amount of 10 to 80% of an overall mass of the auxiliary pad 142. The cesium-doped lead triiodide perovskite mixed with organic cations has two states: a stable state of lattice shrinkage in a normal state and a stable state of lattice expansion after a certain process. After irradiating with light equivalent to nine sunlight intensities for 100 to 180 minutes, the cesium-doped lead triiodide perovskite mixed with organic cations changes from a stable shrinking state to a stable expansion state and can form a maximum expansion of 160% of itself.

Figure 5:
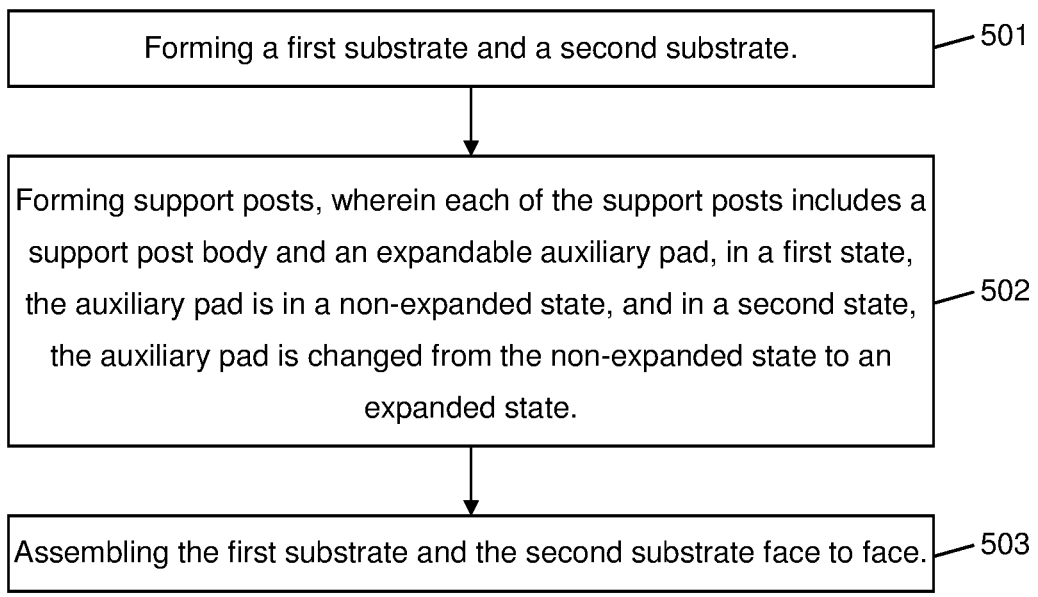
FIG. 5 is a manufacturing flowchart of the liquid crystal display panel provided by an embodiment of the present application.

At the same time, the present application provides a manufacturing method of the liquid crystal display panel, as shown in FIG. 5, including:

step S501, forming a first substrate and a second substrate;

step S502, forming support posts, wherein each of the support posts includes a support post body and an expandable auxiliary pad, in a first state, the auxiliary pad is in a non-expanded state, and in a second state, the auxiliary pad is changed from the non-expanded state to an expanded state; and step S503, assembling the first substrate and the second substrate face to face.

The present application provides the manufacturing method of the liquid crystal display panel. The manufacturing method of the liquid crystal display panel forms the support posts including the support post body and the auxiliary pad. When the liquid crystal display panel is in the normal state, the auxiliary pad is in the non-expanded state, and the support post body and the auxiliary pad support the first substrate and the second substrate together. After the liquid crystal display panel is compressed by the external force, the auxiliary pad in the compressed region is processed, so the auxiliary pad in the compressed region is transformed from the non-expanded state to the expanded state which is stable. The auxiliary pad in the expanded state increases its own thickness, which compensates for a height difference caused by a corresponding support post body which cannot be restored after being compressed by the external force. This relieves the problem of the appearance of Mura in the liquid crystal display panel, which is caused by the support posts being unable to uniformly support the first substrate and the second substrate due to failure of the support post body to fully restore as a result of compression by an excessive force.

The step S501 of forming the first substrate and the second substrate forms a color filter substrate and an array substrate separately. The first substrate can be the color filter substrate, and the second substrate 120 is the array substrate, or the first substrate can be the array substrate, and the second substrate is the color filter substrate.

In the liquid crystal display panel, the support posts generally include a primary support post and a secondary support post. A horizontal height of the primary support post is greater than a horizontal height of the secondary support post. The primary support post is configured to mainly support the first substrate and the second substrate. The secondary support post is configured to assist in supporting the first substrate and the second substrate. In an embodiment, the primary support post includes a primary support post body and an expandable auxiliary pad, and the secondary support post only includes a secondary support post body. In another embodiment, the primary support post includes a primary support post body and an expandable primary auxiliary pad, and the secondary support post includes a secondary support post body and an expandable secondary auxiliary pad. The following takes a support post including the support post body and the auxiliary pad as an example to further explain the manufacturing method of the liquid crystal display panel provided by the present application.

The step S502 of forming the support posts includes:

Step S5021, mixing an expansive material into a photoresist material in a predetermined ratio to form a material for the auxiliary pad.

The expansive material is a material that can expand in volume under certain conditions and cannot be restored after volume expansion. In an embodiment, the expansive material includes cesium-doped lead triiodide perovskite mixed with organic cations ($Fa_{0.7}Ma_{0.25}Cs_{0.05}PbI_3$). The cesium-doped lead triiodide perovskite mixed with organic cations is present in an amount of 10 to 80% of an overall mass of the auxiliary pad 142.

Step S5022, forming the auxiliary pad and the support post pad.

In an embodiment, the step S5022 of forming the auxiliary pad and the support post pad includes:

Forming the support post body on a side of the first substrate facing the second substrate; specifically, the support post body with a height ranging from 1 to 10 um and a diameter ranging from 5 to 100 um is formed on the first substrate by any one of manufacturing methods such as exposure and development, inkjet printing, or coating method. The support post body is generally a circular column or a circular stage.

Forming the auxiliary pad on a side of the second substrate facing the first substrate. When assembling, the auxiliary pad corresponds to the support post body. Specifically, the auxiliary pad with a thickness ranging from 0.1 to 5 um and a width ranging from 20 to 200 um is formed on the second substrate by any one of manufacturing methods such as exposure and development, inkjet printing, or coating method. The auxiliary pad is generally a circular column or a cube block.

It should be noted and made sure that after assembling, the width of the auxiliary pad is 2 to 10 um greater than a cross-sectional diameter of a contact area between the support post body and the auxiliary pad, and a center of the auxiliary pad coincides with a center of the support post body.

In another embodiment, the step S5022 of forming the auxiliary pad and the support post pad includes:

Forming the auxiliary pad on a side of the first substrate facing the second substrate; specifically, the auxiliary pad with a thickness ranging from 0.1 to 5 um and a width ranging from 20 to 200 um is formed on the second substrate by any one of manufacturing methods such as exposure and development, inkjet printing, or coating method. The auxiliary pad is generally a circular column or a cube block.

Forming the support post body on a side of the support post body away from the first substrate, specifically, the support post body with a height ranging from 1 to 10 um and a diameter ranging from 5 to 100 um is formed on the first substrate by any one of manufacturing methods such as exposure and development, inkjet printing, or coating method. The support post body is generally a circular column or a circular stage. It should be noted that the width of the auxiliary pad is 2 to 10 um greater than a cross-sectional diameter of a contact area between the support post body and the auxiliary pad, and a center of the auxiliary pad coincides with a center of the support post body.

In yet another embodiment, the step S5022 of forming the auxiliary pad and the support post pad includes:

Forming the support post body on a side of the first substrate facing the second substrate, specifically, the support post body with a height ranging from 1 to 10 um and a diameter ranging from 5 to 100 um is formed on the first substrate by any one of manufacturing methods such as exposure and development, inkjet printing, or coating method. The support post body is generally a circular column or a circular stage.

Forming the auxiliary pad on a side of the support post body away from the first substrate; specifically, the auxiliary pad with a thickness ranging from 0.1 to 5 um and a width ranging from 20 to 200 um is formed on the second substrate by any one of manufacturing methods such as exposure and development, inkjet printing, or coating method. The auxiliary pad is generally a circular column or a cube block. It should be noted that the width of the auxiliary pad is 2 to 10 um greater than a cross-sectional diameter of a contact area between the support post body and the auxiliary pad, and a center of the auxiliary pad coincides with a center of the support post body.

When the liquid crystal display panel is in the second state, which means that the liquid crystal display panel is compressed by the external force, the auxiliary pad is in the expanded state, and changing of the auxiliary pad from the non-expanded state to the expanded state includes:

irradiating a compressed region of the liquid crystal display panel with light equivalent to nine sunlight intensities for 100 to 180 minutes.

This is mainly because of two states of the cesium-doped lead triiodide perovskite mixed with organic cations: a stable state of lattice shrinkage in a normal state and a stable state of lattice expansion after a certain process. After irradiating with light equivalent to nine sunlight intensities for 100 to 180 minutes, the cesium-doped lead triiodide perovskite mixed with organic cations changes from a stable shrinking state to a stable expansion state.

Figure 6:
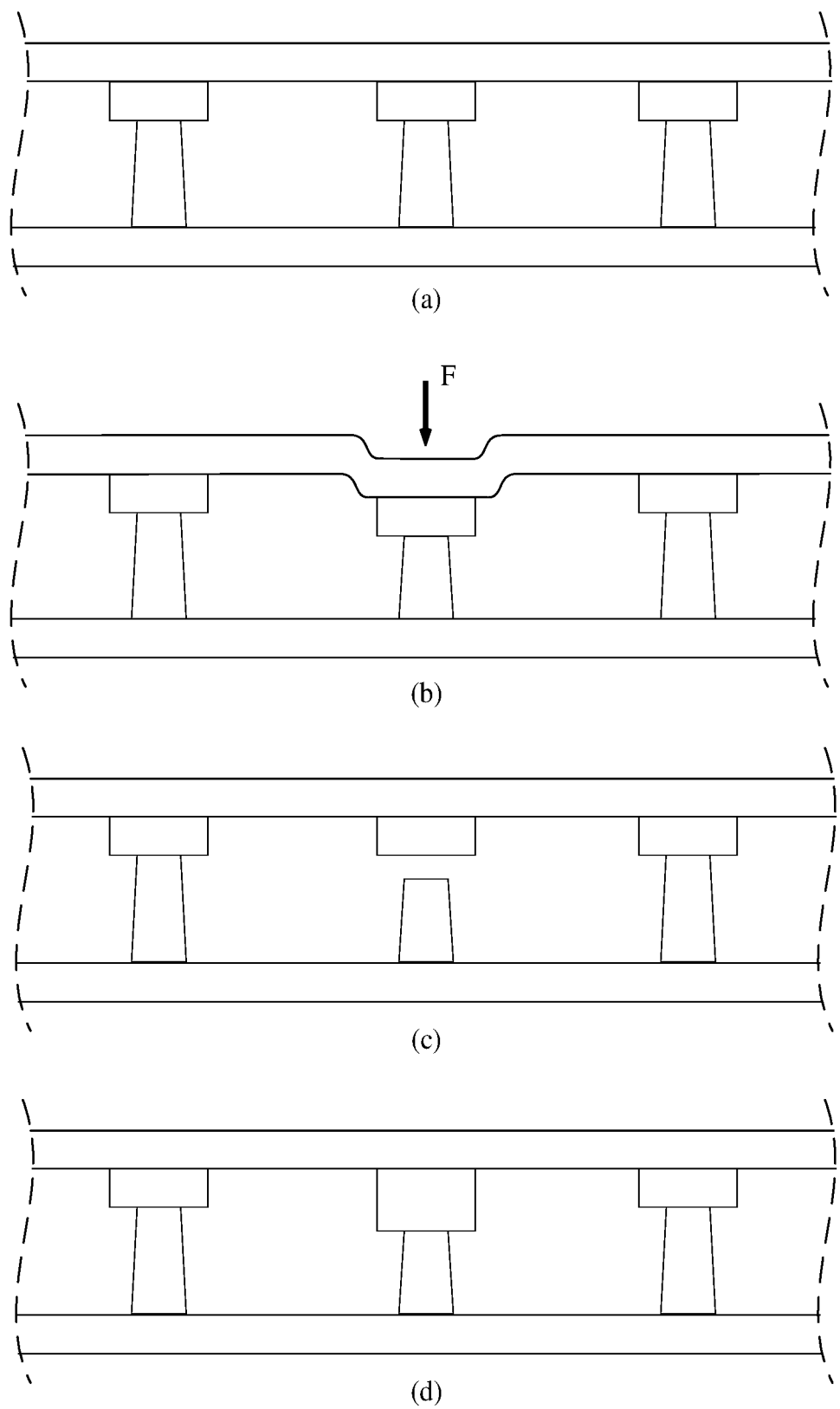
FIG. 6 is a diagram showing an effect of the liquid crystal display panel provided by an embodiment of the present application.

The liquid crystal display panel and the manufacturing method thereof provided in an embodiment of the present application is further explained in detail below with reference to FIG. 6. When the liquid crystal display panel is in the first state which is the normal state, as shown in FIG. 6(*a*), the auxiliary pad is in the non-expanded state, and the support post body and the auxiliary pad support the first substrate and the second substrate together. As shown in FIG. 6(*b*), after the liquid crystal display panel is compressed by an external force F, the support post body in the compressed region is compressed by an excessive force. As shown in FIG. 6(*c*), the support post body cannot be restored to its original state, and support for the first substrate and the second substrate becomes weak, resulting in uneven thickness of the liquid crystal display panel and occurrence of Mura. At this time, the auxiliary pad in the compressed region is processed and transformed into the second state. As shown in FIG. 6(*d*), the auxiliary pad in the compressed region is transformed from the non-expanded state to the expanded state which is stable after the process. The auxiliary pad in the expanded state increases its own thickness, which compensates for a height difference caused by a corresponding support post body which cannot be restored after being compressed by the external force. This relieves the problem of the appearance of Mura in the liquid crystal display panel, which is caused by the support posts being unable to uniformly support the first substrate and the second substrate due to failure of the support post body to fully restore as a result of compression by an excessive force.

According to the above embodiments, it can be known that:

the present application provides the liquid crystal display panel and the manufacturing thereof. The liquid crystal display panel includes the first substrate, the second substrate, the liquid crystal layer filled between the first substrate and the second substrate, and the support posts disposed between the first substrate and the second substrate configured to support the first substrate and the second substrate and ensure the distance between the first substrate and the second substrate. Each of the support posts includes the support post body and the expandable auxiliary pad. In the first state, the auxiliary pad is in the non-expanded state, and in the second state, the auxiliary pad is in the expanded state. When the liquid crystal display panel is in the normal state, the auxiliary pad is in the non-expanded state. After the liquid crystal display panel is compressed by the external force, the auxiliary pad in the compressed region is processed, so the auxiliary pad in the compressed region is transformed from the non-expanded state to the expanded state which is stable. The auxiliary pad in the expanded state increases its own thickness, which compensates for the height difference caused by the corresponding support post body which cannot be restored after being compressed by the external force. This relieves the problem of the appearance of Mura in the liquid crystal display panel, which is caused by the support posts being unable to uniformly support the first substrate and the second substrate due to failure of the support post body to fully restore as a result of compression by an excessive force.

Although the present application has been disclosed above by the preferred embodiments, the preferred embodiments are not intended to limit the application. One of ordinary skill in the art, without departing from the spirit and scope of the present application, can make various modifications and variations of the present application. Therefore, the scope of the claims to define the scope of equivalents.

What is claimed is:

1. A liquid crystal display panel, comprising:
   a first substrate;
   a second substrate;
   a liquid crystal layer filled between the first substrate and the second substrate; and
   support posts disposed between the first substrate and the second substrate configured to support the first substrate and the second substrate and ensure a distance between the first substrate and the second substrate, wherein each of the support posts comprises a support post body and an expandable auxiliary pad;
   wherein in a first state, the auxiliary pad is in a non-expanded state, and in a second state, the auxiliary pad is in an expanded state;
   wherein material of the auxiliary pad comprises an expansive material; and
   wherein the expansive material comprises cesium-doped lead triiodide perovskite mixed with organic cations.

2. The liquid crystal display panel as claimed in claim 1, wherein the support post body and the auxiliary pad are disposed on the first substrate.

3. The liquid crystal display panel as claimed in claim 2, wherein the auxiliary pad is disposed on a side of the first substrate near the second substrate, and the support post body is disposed on a side of the auxiliary pad near the second substrate.

4. The liquid crystal display panel as claimed in claim 2, wherein the support post body is disposed on a side of the first substrate near the second substrate, and the auxiliary pad is disposed on a side of the support post body near the second substrate.

5. The liquid crystal display panel as claimed in claim 2, wherein the support post body is disposed on the first substrate, the auxiliary pad is disposed on the second substrate, and the support post body is disposed opposite to the auxiliary pad.

6. The liquid crystal display panel as claimed in claim 1, wherein the cesium-doped lead triiodide perovskite mixed with organic cations is present in an amount of 10 to 80% of an overall mass of the auxiliary pad.

7. The liquid crystal display panel as claimed in claim 1, wherein the auxiliary pad is a cube block with a thickness ranging from 0.1 to 5 μm and a width ranging from 20 to 200 μm.

8. The liquid crystal display panel as claimed in claim 1, wherein the support post body is a circular column or a circular stage with a height ranging from 1 to 10 μm and a diameter ranging from 5 to 100 μm.

9. The liquid crystal display panel as claimed in claim 1, wherein a width of the auxiliary pad is 2 to 10 μm greater than a cross-sectional diameter of a contact area between the support post body and the auxiliary pad.

10. The liquid crystal display panel as claimed in claim 1, wherein the support posts comprise a primary support post and a secondary support post, the primary support post comprises a primary support post body and an expandable auxiliary pad, and the secondary support post comprises a secondary support post body.

11. The liquid crystal display panel as claimed in claim 1, wherein the support posts comprise a primary support post and a secondary support post, the primary support post comprises a primary support post body and an expandable primary auxiliary pad, and the secondary support post comprises a secondary support post body and an expandable secondary auxiliary pad.

12. A manufacturing method of a liquid crystal display panel, comprising:
   forming a first substrate and a second substrate;
   forming support posts, wherein each of the support posts comprises a support post body and an expandable auxiliary pad, in a first state, the auxiliary pad is in a non-expanded state, and in a second state, the auxiliary pad is changed from the non-expanded state to an expanded state; and
   assembling the first substrate and the second substrate face to face
   wherein forming the support posts comprises:
   mixing an expansive material into a photoresist material in a predetermined ratio to form a material for the auxiliary pad; and
   forming the auxiliary pad and the support post pad; and
   wherein the expansive material comprises cesium-doped lead triiodide perovskite mixed with organic cations.

13. The manufacturing method of the liquid crystal display panel as claimed in claim 12 wherein forming the auxiliary pad and the support post pad comprises:
   forming the support post body on a side of the first substrate facing the second substrate; and
   forming the auxiliary pad on a side of the second substrate facing the first substrate;
   wherein when assembling, the auxiliary pad corresponds to the support post body.

14. The manufacturing method of the liquid crystal display panel as claimed in claim 12, wherein forming the auxiliary pad and the support post pad comprises:
   forming the auxiliary pad on a side of the first substrate facing the second substrate; and
   forming the support post body on a side of the support post body away from the first substrate.

15. The manufacturing method of the liquid crystal display panel as claimed in claim 12, wherein forming the auxiliary pad and the support post pad comprises:
  forming the support post body on a side of the first substrate facing the second substrate; and
  forming the auxiliary pad on a side of the support post body away from the first substrate.

16. The manufacturing method of the liquid crystal display panel as claimed in claim 12, wherein a forming process of the auxiliary pad and the support post body comprises exposure and development, inkjet printing, or coating method.

* * * * *